(12) United States Patent
Souda

(10) Patent No.: US 7,359,776 B2
(45) Date of Patent: Apr. 15, 2008

(54) APPARATUS FOR CORRECTING AND DIAGNOSING ANGULAR RATE SENSORS INSTALLED IN AN AUTOMOTIVE VEHICLE

(75) Inventor: Norifumi Souda, Oobu (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 11/007,253

(22) Filed: Dec. 9, 2004

(65) Prior Publication Data

US 2005/0131602 A1   Jun. 16, 2005

(30) Foreign Application Priority Data

Dec. 12, 2003  (JP) ............................. 2003-414642

(51) Int. Cl.
*G06F 19/00* (2006.01)
(52) U.S. Cl. .................... 701/34; 340/995.28; 73/1.75; 73/1.77; 702/93; 702/151
(58) Field of Classification Search ................... 701/34
See application file for complete search history.

(56) References Cited

U.S. PATENT DOCUMENTS 5,296,855 A * 3/1994 Matsuzaki et al. .......... 340/988

6,276,188 B1 * 8/2001 Horiuchi ..................... 73/1.37
6,625,527 B1    9/2003 Ding et al.

FOREIGN PATENT DOCUMENTS

| JP | A-06-107205 | 4/1994 |
| JP | 8-43113 | 2/1996 |
| JP | 08-043113 | * 2/1996 |
| JP | A-10-002747 | 1/1998 |
| JP | A-2002-053024 | 2/2002 |
| JP | A-2002-537549 | 11/2002 |

* cited by examiner

*Primary Examiner*—Thomas Black
*Assistant Examiner*—Marie A Weiskopf
(74) *Attorney, Agent, or Firm*—Posz Law Group, PLC

(57) ABSTRACT

An offset diagnosing and correcting section obtains an offset correction value from an angular rate value obtained from detection signals produced from a plurality of angular rate sensors and a detection signal produced from an angular rate sensor when an automotive vehicle is in a stopped condition. The offset diagnosing and correcting section performs an offset correction for the angular rate value with reference to this offset correction value. A sensor sensitivity diagnosing section detects a turning condition of the automotive vehicle based on detection signals of the plurality of angular rate sensors, and diagnoses the sensitivity of the plurality of angular rate sensors based on offset corrected angular rate values of these angular rate sensors when the automotive vehicle is in a turning condition.

17 Claims, 3 Drawing Sheets

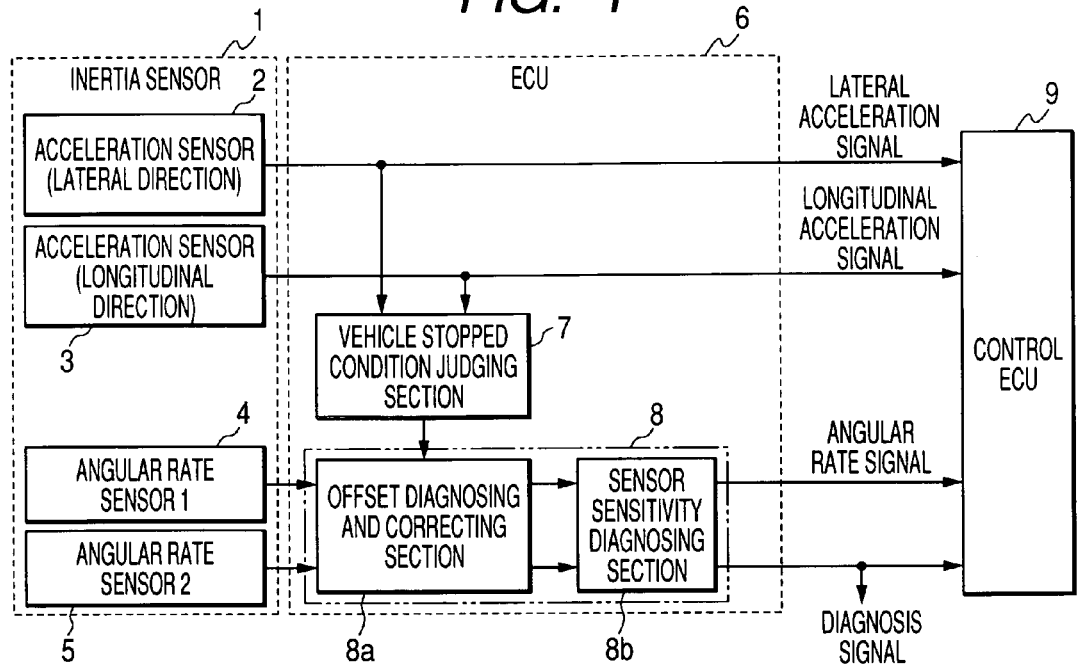
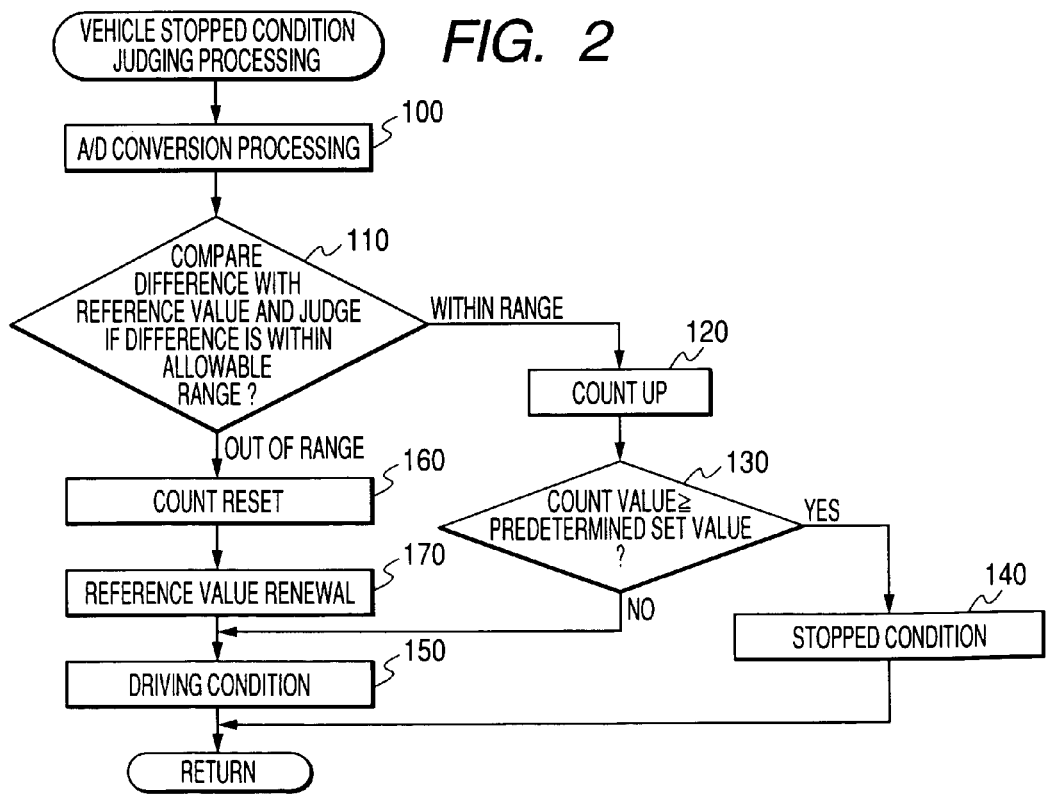

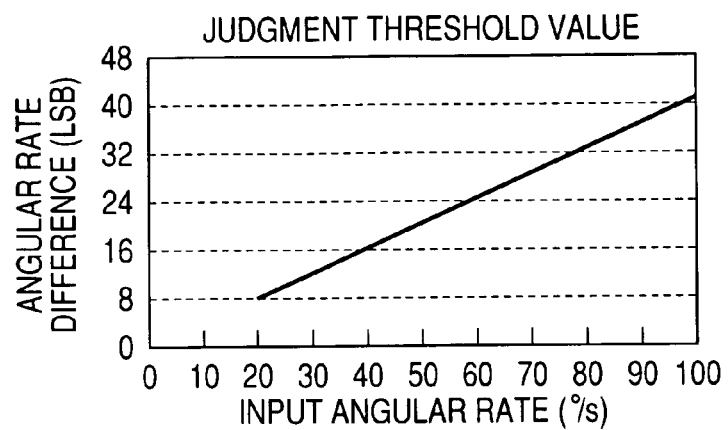
FIG. 5
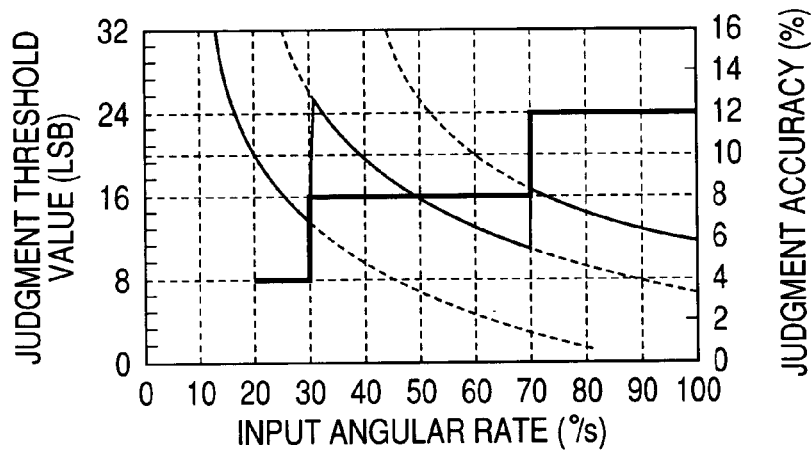
FIG. 6
FIG. 7
(PRIOR ART)
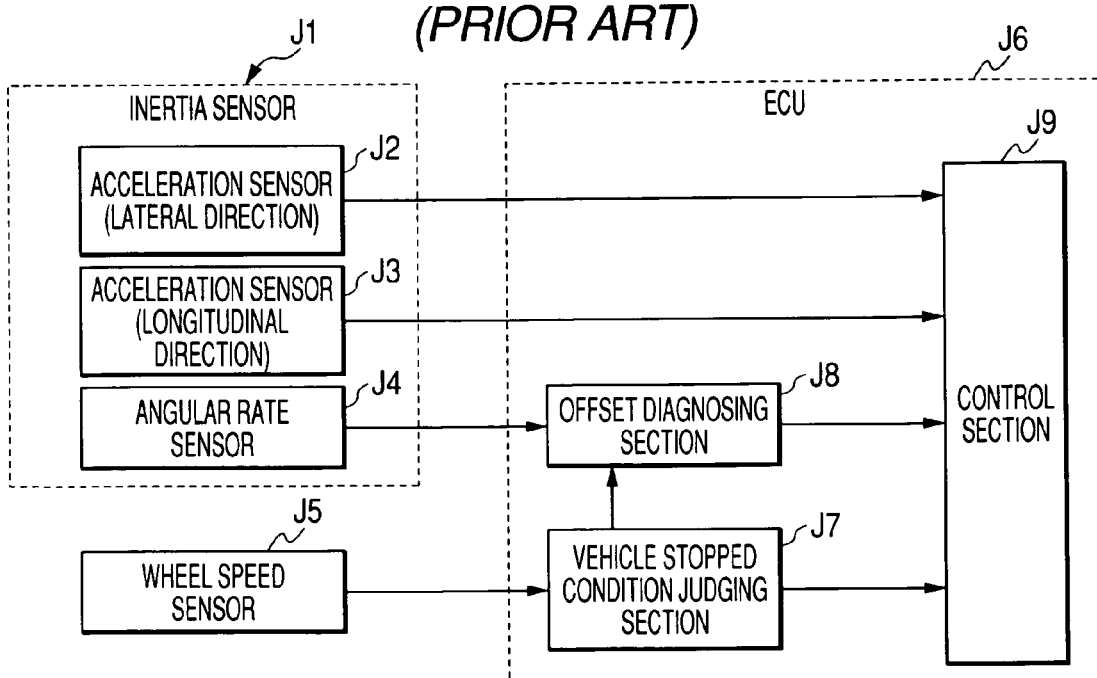

APPARATUS FOR CORRECTING AND DIAGNOSING ANGULAR RATE SENSORS INSTALLED IN AN AUTOMOTIVE VEHICLE

CROSS-REFERENCE TO RELATED APPLICATION

This application is based upon and claims the benefit of the prior Japanese Patent Application No. 2003-414642 filed on Dec. 12, 2003 so that the description of which is incorporated herein by reference.

BACKGROUND OF THE INVENTION

The present invention relates to an apparatus for correcting and diagnosing angular rate sensors installed in an automotive vehicle which is capable of judging whether or not the angular rate sensors are generating correct output signals.

When diagnosis or correction for the offset of angular rate sensors is performed in respective angular rate sensors, an automotive vehicle system sends a vehicle speed signal to respective angular rate sensors. Based on this vehicle speed signal, it is checked whether or not the automotive vehicle is stationary or stopped before diagnosing or correcting the offset in outputs of respective angular rate sensors.

Hereinafter, as one example of such an apparatus performing the offset correction for angular rate sensors, the inertia sensors installed in an automotive vehicle will be explained with the attached drawing. FIG. 7 is a block diagram showing an inertia sensor installed in an automotive vehicle and an associated signal processing section.

As shown in FIG. 7, an automotive inertia sensor J1 consists of two acceleration sensors J2 and J3 and a single angular rate sensor J4. The acceleration sensor J2 detects an acceleration of an automotive vehicle in the lateral (right and left) direction, and the acceleration sensor J3 detects an acceleration of this automotive vehicle in longitudinal (back and forth) direction. The angular rate sensor J4 detects an angular rate of the automotive vehicle. Furthermore, a wheel speed sensor J5 detects the rotational speed of a wheel of the automotive vehicle. An electronic control unit (hereinafter, referred to as ECU) J6 receives detection signals of these sensors J2 to J5 and processes the received signals. In this respect, ECU J6 acts as a signal processing section for the automotive inertia sensor.

ECU J6 includes a vehicle stopped condition judging section J7, an offset diagnosing section J8, and a control section 19. The vehicle stopped condition judging section J7 judges whether a wheel is rotating or not based on the detection signal obtained from the wheel speed sensor J5. In other words, the vehicle stopped condition judging section J7 judges whether or not the automotive vehicle is stopped or stationary. The vehicle stopped condition judging section J7 outputs a signal indicating a stopped condition of the automotive vehicle according to its judgment result.

The offset diagnosing section J8 receives the detection value of angular rate sensor J4 and the signal indicating a stopped condition of the automotive vehicle sent from the vehicle stopped condition judging section J7. The offset diagnosing section J8 obtains an offset of the angular rate sensor J4 based on a detection value sent from the angular rate sensor J4 in a condition that the automotive vehicle is stopped. More specifically, the detection value of angular rate sensor J4 should be zero when the automotive vehicle is in a stopped condition. If the detection value of angular rate sensor J4 is not zero, there will be a significant offset corresponding to the detected value. This offset value is compared with a predetermined value to perform an offset diagnosis. When the offset value is smaller than the predetermined value, the detection value of angular rate sensor J4 is subtracted by the offset amount. The obtained value is used as a new angular rate value reflecting a corrected offset.

The control section J9 is an ECU which is, for example, equipped in a brake control system or in a navigation system. The control section J9 executes various calculations based on entered signals for obtaining automotive vehicle driving conditions used, for example, in the brake control or in the automotive vehicle navigation.

However, in a situation that no vehicle speed signal is obtainable from the automotive vehicle system, the above-described diagnosis will be unfeasible. Considering this drawback, for example as disclosed in the Japanese Patent No. 3404905, it is possible to judge whether the automotive vehicle is stopped or not based on the signals of acceleration sensors J2 and J3 which can detect vibrations of the automotive vehicle in a driving condition.

However, according to the above-described prior art document, it is impossible to judge whether or not an output signal of the angular rate sensor J4 represents a true angular rate in a condition that the angular rate sensor J4 outputs this value in a turning condition of the automotive vehicle. Accordingly, it is impossible to diagnose the sensitivity of angular rate sensor J4. Furthermore, according to a method using a signal obtained from the wheel speed sensor J5, it is impossible to correct the offset of angular rate sensor J4 due to the arrangement of inertia sensor J1.

SUMMARY OF THE INVENTION

In view of the above-described problems, the present invention has an object to provide an apparatus for correcting and diagnosing angular rate sensors installed in an automotive vehicle which is capable of correcting the offset of angular rate sensors and diagnosing the sensitivity of angular rate sensors without modifying the arrangement of an inertia sensor, In order to accomplish the above and other related objects, the present invention provides an apparatus for correcting and diagnosing angular rate sensors installed in an automotive vehicle, including a plurality of angular rate sensors, at least one acceleration sensor, a vehicle stopped condition judging section, and an angular rate correcting and diagnosing section. The plurality of angular rate sensors, installed in an automotive vehicle, generate detection signals representing an angular rate of the automotive vehicle. The acceleration sensor, installed in the automotive vehicle, generates a detection signal representing an acceleration of the automotive vehicle. The vehicle stopped condition judging section identifies a stopped condition of the automotive vehicle based on the detection signal obtained from the acceleration sensor. And, the angular rate correcting and diagnosing section receives the detection signals generated from the plurality of angular rate sensors and judgment result obtained from the vehicle stopped condition judging section. The angular rate correcting and diagnosing section includes an offset diagnosing and correcting section and a sensor sensitivity diagnosing section. The offset diagnosing and correcting section obtains an offset correction value from an angular rate value obtained from the detection signals generated from the plurality of angular rate sensors and performs an offset correction for the angular rate value based on the offset correction value when the vehicle stopped condition judging section detects a stopped condition of the automotive vehicle. And, the sensor sensitivity diagnosing section judges whether or not the automotive vehicle is in a turning condition based on the detection signals of the plurality of angular rate sensors and diagnoses the sensitivity of the plurality of angular rate sensors with reference to offset corrected angular rate values of the plurality of angular rate sensors when the automotive vehicle is in a turning condition.

According to this arrangement, the offset correction is performed during a stopped condition of the automotive vehicle and the abnormal sensitivity judgment is performed during a turning condition of the automotive vehicle. Thus, the present invention can provide an apparatus for correcting and diagnosing angular rate sensors which is installed in an automotive vehicle and is capable of accurately correcting the offset of respective angular rate sensors and also capable of diagnosing the sensitivity of respective angular rate sensors. In this manner, the present invention makes it possible to perform the offset correction and the self sensitivity diagnosis by using only the detection signals of the acceleration sensor and the angular rate sensors. In other words, the present invention can perform the offset correction and the self sensitivity diagnosis without modifying the arrangement of the inertia sensor.

According to the present invention, in the apparatus for correcting and diagnosing angular rate sensors installed in an automotive vehicle, it is preferable that the sensor sensitivity diagnosing section diagnoses the sensitivity of the plurality of angular rate sensors by comparing a difference between the offset corrected angular rate values of the plurality of angular rate sensors with a predetermined judgment threshold value.

In this case, it is further preferable that the judgment threshold value is set in such a manner that it increases in proportion to an input angular rate obtained from detection signals of the plurality of angular rate sensors. Alternatively, it is preferable that the judgment threshold value is set in such a manner that it increases stepwise in response to an increase of an input angular rate obtained from detection signals of the plurality of angular rate sensors.

Furthermore, it is preferable that the sensor sensitivity diagnosing section diagnoses the sensitivity only when an input angular rate is equal to or larger than a predetermined angular rate, based on detection signals obtained from the plurality of angular rate sensors.

According to this arrangement, it becomes possible to prohibit the sensitivity diagnosis when the output difference of respective angular rate sensors is within an error range.

BRIEF DESCRIPTION OF THE DRAWINGS

The above and other objects, features and advantages of the present invention will become more apparent from the following detailed description which is to be read in conjunction with the accompanying drawings, in which:

FIG. 1 is a block diagram showing the arrangement of an apparatus for correcting and diagnosing angular rate sensors installed in an automotive vehicle in accordance with a preferred embodiment of the present invention;

FIG. 2 is a flowchart showing the processing for judging a stopped condition of an automotive vehicle in accordance with the preferred embodiment of the present invention;

FIG. 5 is a graph showing a relationship between an input angular rate and a judgment threshold value for the output difference in accordance with the preferred embodiment of the present invention;

FIG. 6 is a graph showing a relationship between an input angular rate and a judgment threshold value for the output difference in accordance with another embodiment of the present invention; and FIG. 7 is a block diagram showing the arrangement of a conventional automotive inertia sensors and its signal processing section.

DESCRIPTION OF THE PREFERRED EMBODIMENTS

Figure 3:
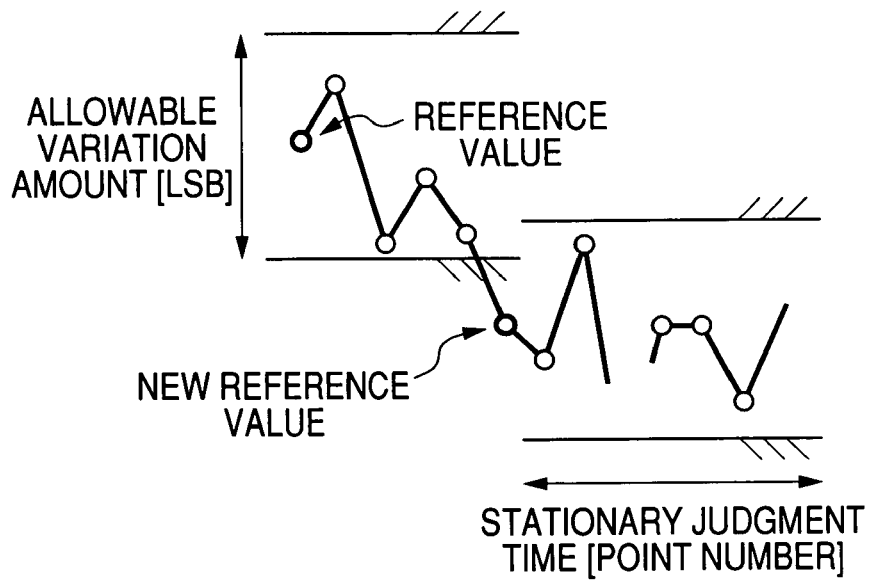
FIG. 3 is a view schematically explaining the method for setting a reference value in accordance with the preferred embodiment of the present invention.

Preferred embodiments of the present invention will be explained hereinafter with reference to attached drawings.

FIG. 1 is a block diagram showing the arrangement of an apparatus for correcting and diagnosing angular rate sensors installed in an automotive vehicle in accordance with a preferred embodiment of the present invention. Hereinafter, with reference to this drawing, the arrangement of this apparatus will be explained in detail.

As shown in FIG. 1, an automotive inertia sensor 1 includes a pair of acceleration sensors 2 and 3. The acceleration sensor 2 detects an acceleration of the automotive vehicle in the lateral (right and left) direction. The acceleration sensor 3 detects an acceleration of the automotive vehicle in the longitudinal (back and forth) direction. Furthermore, for the purpose of obtaining an accurate angular rate value, the automotive inertia sensor 1 includes a pair of angular rate sensors 4 and 5. ECU (i.e. electronic control unit) 6, serving as a signal processing section for the automotive inertia sensor 1, receives detection signals of these sensor 1 s 2 to 5.

ECU 6 includes a vehicle stopped condition judging section 7 and an angular rate correcting and diagnosing section 8 to obtain a correct angular rate value. ECU 6 outputs an angular rate signal representing a correct angular rate value and also directly outputs detection signals of the acceleration sensors 2 and 3.

The vehicle stopped condition judging section 7 receives detection signals of two acceleration sensors 2 and 3 to execute vehicle stopped condition judging processing based on these detection signals. More specifically, the vehicle stopped condition judging section 7 judges whether or not the automotive vehicle is in a stopped condition, and also outputs a signal indicating a stopped condition of the automotive vehicle when such a condition is detected. Details of the vehicle stopped condition judging processing performed by the vehicle stopped condition judging section 7 will be explained later.

The angular rate correcting and diagnosing section 8 judges whether or not the automotive vehicle is in a turning condition, and also performs offset diagnosis and correction for angular rate value as well as diagnosis for sensor sensitivity (i.e. accuracy). The angular rate correcting and diagnosing section 8 consists of an offset diagnosing and correcting section 8a and a sensor sensitivity diagnosing section 8b.

The offset diagnosing and correcting section 8a receives a judgment signal from the vehicle stopped condition judging section 7 and sets or renews an offset correction value with reference to the judgment signal received from the vehicle stopped condition judging section 7 and detection values of respective angular rate sensors 4 and 5. Furthermore, the offset diagnosing and correcting section 8a performs offset correction for the detection values of respective angular rate sensors 4 and 5 based on renewed offset correction values and outputs the offset corrected detection values to the sensor sensitivity diagnosing section 8b.

The sensor sensitivity diagnosing section 8b diagnoses the sensitivity of respective angular rate sensors 4 and 5 with reference to the judgment signal obtained from the vehicle stopped condition judging section 7, the judgment result with respect to turning condition of the automotive vehicle judged by the angular rate correcting and diagnosing section 8, and the offset corrected detection values of respective angular rate sensors 4 and 5 sent from the offset diagnosing and correcting section 8a. Then, in a case that the sensitivity of respective angular rate sensors 4 and 5 is judged as being normal through this diagnosis, the sensor sensitivity diagnosing section 8b outputs either one of the offset corrected detection values of respective angular rate sensors 4 and 5 as an angular rate signal. Furthermore, in a case that the sensitivity of respective angular rate sensors 4 and 5 is judged as being abnormal through this diagnosis, the sensor sensitivity diagnosing section 8b outputs a predetermined diagnosis signal. A control ECU 9 inputs this diagnosis signal. Although not shown in the drawing, it is preferable to send the diagnosis signal to a warning device equipped in the automotive vehicle to notify a driver of abnormality occurring in the angular rate sensors 4 and 5.

The control ECU 9 also inputs the acceleration signals of respective acceleration sensors 2 and 3 (representing the vehicle accelerations in the lateral direction and in the longitudinal direction) and the offset corrected angular rate signal produced from the angular rate correcting and diagnosing section 8. The control ECU 9 is, for example, equipped in a brake control system or in a navigation system of the automotive vehicle. The control ECU 9 executes various calculations based on entered respective signals for obtaining automotive vehicle driving conditions used, for example, in the brake control or in the automotive vehicle navigation.

The above-described apparatus for correcting and diagnosing angular rate sensors installed in an automotive vehicle executes the vehicle stopped condition judging processing and the angular rate correcting and diagnosing processing in the following manner.

First, the vehicle stopped condition judging processing will be explained with reference to a flowchart shown in FIG. 2. The vehicle stopped condition judging section 7 provided in ECU 6 executes the processing of this flowchart at predetermined processing cycles in response to turning of an ignition switch (not shown in the drawing) equipped in the automotive vehicle. This processing can be performed based on both detection signals of respective acceleration sensors 2 and 3 or based on either one of these signals. According to this embodiment, only the detection signal of acceleration sensor 3 is used for the vehicle stopped condition judging processing.

After starting the vehicle stopped condition judging processing, the first processing to be executed is step 100 in which A-D conversion processing is performed to convert an analog detection signal obtained from the acceleration sensor 3 into a digital signal. This A-D conversion processing is performed at predetermined calculation cycles.

Next, the processing executed in step 110 is a comparison between the digital converted acceleration value and a reference value and a judgment as to whether or not a difference between the compared values is within a predetermined range. The reference value used in the step 110 will be explained with reference to FIG. 3, hereinafter.

FIG. 3 is a view schematically explaining the method for setting the reference value. For example, an acceleration value obtained in a first cycle is set as an initial reference value. Then, an allowable variation amount is set based on the reference value being thus determined. For example, the allowable variation amount has a predetermined width with its center positioned at a level corresponding to the reference value. This allowable variation amount is a variation amount of acceleration value assumable in a condition that driving conditions of the automotive vehicle do not change so much. Usually, when the automotive vehicle is driving, the variation amount of acceleration value tends to become so large that the acceleration value may change beyond the range of allowable variation amount at least in a predetermined time. On the contrary, if the automotive vehicle is in a stopped condition, the variation amount of acceleration value will be small. Accordingly, the acceleration value remains within the range of allowable variation amount during this predetermined time. From the foregoing, when successively obtained acceleration values remain within the range of this allowable variation amount, it means that the automotive vehicle driving conditions did not change so much. Furthermore, when such conditions continue for a stationary judgment time corresponding to the above-described predetermined time, it can be concluded that the automotive vehicle is in a stopped condition. Furthermore, when the variation amount of acceleration value changes beyond the range of allowable variation amount, it means that the automotive vehicle driving conditions have changed and it is concluded that the automotive vehicle is in a driving condition.

Accordingly, the successively obtained acceleration values are compared with the predetermined reference value to obtain the difference between the compared values. Then, it is checked whether or not the obtained difference is within the range of allowable variation amount. When the acceleration value is within the range of allowable variation amount, the reference value having been already set is continuously used to check the change of automotive vehicle driving conditions. When the acceleration value is out of the range of allowable variation amount, the reference value is renewed by an acceleration value obtained at the time the acceleration has first changed beyond this range. In this manner, the reference value is adequately renewed according to such a setting method.

According to this embodiment, a stationary judgment is executed based on the acceleration value obtained from the detection signal of the acceleration sensor 3. To this end, the acceleration sensor 3 outputs a detection signal including an effect of gravity when the automotive vehicle is stopped on a slope. Therefore, the detection signal of the acceleration sensor 3 obtained when the automotive vehicle is stopped on such an inclined surface is different from a detection signal obtained when the automotive vehicle is stopped on a level surface. However, this embodiment can set the reference value based on the momentarily obtained detection signal regardless of the conditions (i.e. slope or level) of the road surface on which the automotive vehicle is stopped. Thus, this embodiment can accurately perform the vehicle stopped condition judgment based on the variation amount with reference to the reference value being thus accurately determined.

Returning to the step 110 of FIG. 2, when the difference between the digital converted acceleration value and the reference value is within the predetermined range, the processing to be executed next is step 120 in which a counter (not shown) equipped in ECU 6 is counted up. The count value of this counter is equal to the number of vehicle stopped condition judgments having been executed and represents the period of time during which the automotive vehicle driving conditions did not change. Namely, multiplying this count value with the period of calculation cycle will obtain the period of time during which the automotive vehicle driving conditions did not change.

Accordingly, in the next step 130, it is judged whether or not the count value is equal to or larger than a predetermined set value corresponding to the stationary judgment time. In other words, the stationary judgment time can be obtained by multiplying this set value with the period of processing cycle for the vehicle stopped condition judging processing.

When the counter value is equal to or larger than the predetermined set value (i.e. YES in step 130), it means that the automotive vehicle driving conditions did not change for the stationary judgment time and accordingly it is concluded that the automotive vehicle is in a stopped condition. In this case, the processing to be executed next is step 140 in which a vehicle stopped condition flag is set to indicate the condition that the automotive vehicle is in a stopped condition.

On the other hand, when the counter value is less than the predetermined set value (i.e. NO in step 130), it is too early to identify the stopped condition of the automotive vehicle. Thus, the processing to be executed in this case is step 150 in which a driving condition flag is set to indicate the condition that the automotive vehicle is in a driving condition. Furthermore, in this step 150, the vehicle stopped condition flag is reset.

On the other hand, in the step 110 of FIG. 2, the difference between the digital converted acceleration value and the reference value may go out of the predetermined range. In such a case, the processing to be executed next is step 160 in which the counter value of the counter is reset. Subsequently, the processing of step 170 is executed to perform reference value renewing processing. More specifically, in this reference value renewing processing, an acceleration value obtained in this cycle is set as a new reference value. Then, in step 150, the driving condition flag is set.

In short, this embodiment resets the count value and renews the reference value in response to detection of driving condition of the automotive vehicle. Then, the renewed reference value is used in the succeeding vehicle stopped condition judgments.

The above-described vehicle stopped condition judging processing is repetitively executed at predetermined processing cycles to make a judgment as to whether the automotive vehicle is driving or stopped.

Figure 4:
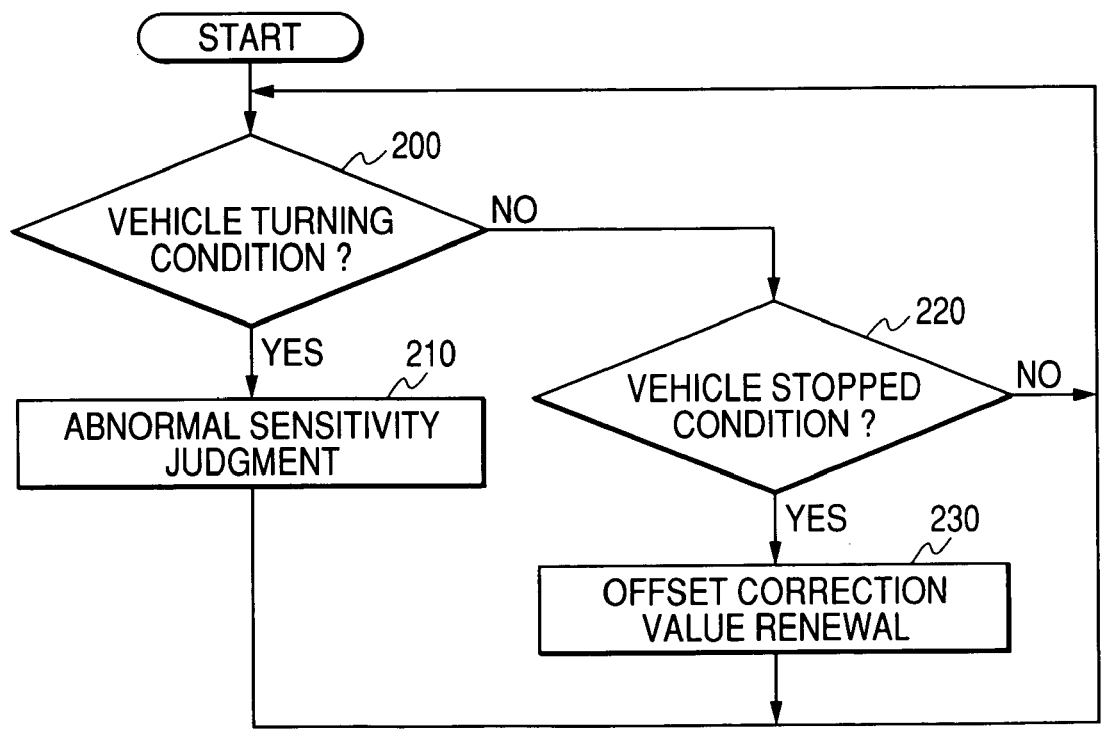
FIG. 4 is a flowchart showing the processing for diagnosing the angular rate correction in accordance with the preferred embodiment of the present invention.

Next, the angular rate correcting and diagnosing processing will be explained with reference to a flowchart shown in FIG. 4. The angular rate correcting and diagnosing section 8 provided in ECU 6 executes the processing of this flowchart at predetermined processing cycles in response to turning on of the ignition switch (not shown in the drawing) equipped in the automotive vehicle.

After starting the angular rate correcting and diagnosing processing, the processing executed first is step 200 in which a judgment is made as to whether or not the automotive vehicle is in a turning condition. This processing is executed based on detection signals of the angular rate sensors 4 and 5. The judgment in step 200 becomes "YES" when generation of any angular rate is confirmed from the detection signals.

In response to "YES" judgment of step 200, the processing executed next is step 210 in which abnormal sensitivity judging processing is executed. The sensor sensitivity diagnosing section 8b executes the abnormal sensitivity judging processing to check whether or not the sensitivity of respective angular rate sensors 4 and 5 is abnormal. More specifically, to check the sensitivity of respective angular rate sensors 4 and 5, it is necessary to monitor the change of angular rate under a condition that the angular rate is actually detected. To this end, this embodiment executes the abnormal sensitivity judging processing upon confirming the generation of any angular rate based on the detection signals of respective angular rate sensors 4 and 5, i.e., when the automotive vehicle is in the turning condition.

More specifically, an output difference between respective angular rate sensors 4 and 5 is obtained. The output difference in this case represents a difference of angular rate values of respective angular rate sensors 4 and 5 which have been subjected to the offset correction performed based on the offset correction value having being set in later-described offset correction value renewing processing (refer to step 230). Then, this difference is compared with a predetermined judgment threshold value prepared for the comparison with the output difference between the input angular rate values.

For example, the judgment threshold value is set with reference to the relationship shown in FIG. 5 according to which the judgment threshold value increases in proportion to an increase of input angular rate. Namely, the output difference between respective angular rate sensors 4 and 5 varies in accordance with the angular rate. Considering this fact, the judgment threshold value of this embodiment is set to be a value proportional to the angular rate.

However, the output difference of respective angular rate sensors 4 and 5 remains within an error range of A-D conversion or the like until the input angular rate exceeds, for example, 20°/s. In this case, the judgment threshold value is not set yet. The input angular rate is an angular rate value obtained from either one of respective angular rate sensors 4 and 5. In this case, it is possible to select a larger angular rate value between two so that diagnosis of the sensitivity can be frequently performed. Alternatively, it is possible to use an average value of two angular rate values of respective angular rate sensors 4 and 5.

Based on such a judgment threshold value, the abnormal sensitivity judgment is feasible for respective angular rate sensors 4 and 5. In a case where the output difference of respective angular rate sensors 4 and 5 exceeds the judgment threshold value, there will be abnormal sensitivity. Accordingly, the angular rate correcting and diagnosing section 8 outputs a predetermined diagnosis signal.

On the other hand, when the judgment result of step 200 is NO, the processing performed next is step 220 in which a judgment is made to check whether or not the automotive vehicle is in a stopped condition. This processing is performed considering the vehicle stopped condition flag to be set in the above-described vehicle stopped condition judging processing. When the vehicle stopped condition flag is set, the judgment result of step 220 becomes YES. When the driving condition flag is set, the judgment result of step 220 becomes NO.

Therefore, when judgment result of step 220 is YES, it means that the automotive vehicle is stopped and accordingly no angular rate is produced. Thus, the processing executed next is step 230 in which offset correction value renewing processing is executed.

The offset diagnosing and correcting section 8*a* executes this offset correction value renewing processing. According to this processing, a new offset value is set based on the detection values of respective angular rate sensors 4 and 5; namely, the offset correction value is renewed. More specifically, when the automotive vehicle is in a stopped condition, the angular rate value should be corrected to zero. Once the offset correction value is renewed in this manner, the offset diagnosing and correcting section 8*a* performs succeeding offset corrections based on the renewed offset correction value. Subtracting the renewed offset correction value from the detection values of respective angular rate sensors 4 and 5 produces an offset corrected angular rate value.

Furthermore, when the judgment result in step 220 is NO, it means that the automotive vehicle is not stopped but the angular rate may not be produced since the automotive vehicle is not in a turning condition. Thus, it can be said that the measurement of correct offset is unfeasible in this situation. Accordingly, no offset correction value is renewed in this case.

The above-described angular rate correcting and diagnosing processing is repetitively executed after the ignition switch is turned on.

As explained above, this embodiment provides an apparatus for correcting and diagnosing angular rate sensors installed in an automotive vehicle which can execute the offset correction when the automotive vehicle is in a stopped condition and execute the abnormal sensitivity judgment when the automotive vehicle is in a turning condition.

Furthermore, to identify the cause of output difference between respective angular rate sensors 4 and 5 which may be caused by offset or by variation of sensitivity, this embodiment detects the stopped condition of the automotive vehicle based on the detection signals of acceleration sensors 2 and 3 incorporated in the inertia sensor, i.e. based on vibration noises of the automotive vehicle. Then, this embodiment performs the offset correction.

Accordingly, this embodiment can provide an apparatus for correcting and diagnosing angular rate sensors installed in an automotive vehicle which is capable of accurately performing the offset correction for respective angular rate sensors 4 and 5 and diagnosing the sensitivity of these angular rate sensors 4 and 5. In other word, from the fact that the offset correction and the self sensitivity diagnosis can be done by using only detection signals of the acceleration sensors 2 and 3 and the angular rate sensors 4 and 5, this embodiment does not require any modification in the arrangement of the inertia sensor 1 which is necessary to perform offset correction and self sensitivity diagnosis.

According to the above-described embodiment, the relationship shown in FIG. 5 is used to determine the judgment threshold value used in the abnormal sensitivity judging processing. However, this is a mere sample. Accordingly, it is possible to use any other judgment threshold value. For example, as shown in FIG. 6, it is preferable that the judgment threshold value changes stepwise in response to an increase of the input angular rate.

In this case, the judgment accuracy of sensitivity, i.e. degree of detectable sensitivity variation, may change as indicated by a thin line. When the input angular rate is 20°/s, it is possible to detect 10% sensitivity variation indicated by a dotted line in the drawing. Thus, the sensitivity diagnosis is sufficiently feasible.

Furthermore, although the above-described embodiment is explained based on an example using two angular rate sensors, it is however needless to say that three or more angular rate sensors can be used. In such a case, even if one sensor is damaged, it is possible to always output an accurate angular rate value by using the remaining sensors. In this respect, it becomes possible to provide a highly reliable unit of angular rate sensors.

The above-described steps in the flowcharts correspond to means for executing the corresponding processing.

As understood from the foregoing description of preferred embodiments, the present invention provides an apparatus for correcting and diagnosing angular rate sensors installed in an automotive vehicle, including a plurality of angular rate sensors (4, 5), at least one acceleration sensor (2, 3), a vehicle stopped condition judging section (7), and an angular rate correcting and diagnosing section (8). The plurality of angular rate sensors (4, 5) are installed in an automotive vehicle for generating detection signals representing an angular rate of the automotive vehicle. The acceleration sensor (2, 3) is installed in the automotive vehicle for generating a detection signal representing an acceleration of the automotive vehicle. The vehicle stopped condition judging section (7) identifies a stopped condition of the automotive vehicle based on the detection signal obtained from the acceleration sensor (2, 3). And, the angular rate correcting and diagnosing section (8) receives the detection signals generated from the plurality of angular rate sensors (4, 5) and judgment result obtained from the vehicle stopped condition judging section (7). The angular rate correcting and diagnosing section (8) includes an offset diagnosing and correcting section (8*a*) and a sensor sensitivity diagnosing section (8*b*). The offset diagnosing and correcting section (8*a*) obtains an offset correction value from an angular rate value obtained from the detection signals generated from the plurality of angular rate sensors (4, 5) and performs an offset correction for the angular rate value based on the offset correction value when the vehicle stopped condition judging section (7) detects a stopped condition of the automotive vehicle. And, the sensor sensitivity diagnosing section (8*b*) judges whether or not the automotive vehicle is in a turning condition based on the detection signals of the plurality of angular rate sensors (4, 5) and diagnoses the sensitivity of the plurality of angular rate sensors (4, 5) with reference to offset corrected angular rate values of the plurality of angular rate sensors (4, 5) when the automotive vehicle is in a turning condition.

According to the present invention, the offset correction is performed when the automotive vehicle is stopped and the abnormal sensitivity judgment is performed when the automotive vehicle is turning. Accordingly, the present invention can provide an apparatus for correcting and diagnosing angular rate sensors which is installed in an automotive vehicle and is capable of accurately correcting the offset of respective angular rate sensors (4, 5) and also capable of diagnosing the sensitivity of respective angular rate sensors (4, 5). In this manner, the present invention makes it possible to perform the offset correction and the self sensitivity diagnosis based on only the detection signals of the acceleration sensor (2, 3) and the angular rate sensors (4, 5). In other words, the present invention can perform the offset correction and the self sensitivity diagnosis without modifying the arrangement of the inertia sensor (1).

Furthermore, in the apparatus for correcting and diagnosing angular rate sensors installed in an automotive vehicle, it is preferable that the sensor sensitivity diagnosing section (8*b*) diagnoses the sensitivity of the plurality of angular rate sensors (4, 5) by comparing a difference between the angular rate values of the plurality of angular rate sensors (4, 5) obtained after the offset correction with a predetermined judgment threshold value.

It is further preferable that the judgment threshold value is set in such a manner that it increases in proportion to an input angular rate obtained from detection signals of the plurality of angular rate sensors (4, 5). Alternatively, it is preferable that the judgment threshold value is set in such a manner that it increases stepwise in response to an increase of an input angular rate obtained from detection signals of the plurality of angular rate sensors (4, 5).

Furthermore, it is preferable that the sensor sensitivity diagnosing section (8b) diagnoses the sensitivity only when an input angular rate is equal to or larger than a predetermined angular rate, based on detection signals obtained from the plurality of angular rate sensors (4, 5). According to this arrangement, it becomes possible to prohibit the sensitivity diagnosis when the output difference of respective angular rate sensors (4, 5) is within an error range.

What is claimed is:

1. An apparatus for correcting and diagnosing angular rate sensors installed in an automotive vehicle, comprising:
   a first angular rate sensor and a second angular rate sensor both installed in an automotive vehicle for generating angular detection signals representing an angular rate of said automotive vehicle;
   at least one acceleration sensor installed in said automotive vehicle for generating an acceleration detection signal representing an acceleration of said automotive vehicle;
   a judging section for judging a stopped condition of said automotive vehicle by applying the acceleration detection signal obtained from said acceleration sensor to an allowable variation range, wherein the allowable variation range can be altered during operation;
   an offset correcting section for generating offsets of the angular detection signals from the first and second angular rate sensors based on a judged result obtained from the judging section; and
   a sensitivity diagnosing section for diagnosing sensitivities of the first and second angular rate sensors based on corrected angular detection signals from the first and second angular rate sensors, the corrected angular detection signals being generated based on the angular detection signals and the offsets of the angular detection signals.

2. The apparatus in accordance with claim 1,
   wherein said sensor sensitivity diagnosing section diagnoses said sensitivities only when an input angular rate is equal to or larger than a predetermined angular rate, based on the angular detection signals obtained from the first and second angular rate sensors, and
   wherein the input angular rate value is one of: a maximum of the angular detection signals from the first and second angular rate sensors, and an average of the angular detection signals from the first and second angular rate sensors.

3. The apparatus in accordance with claim 1,
   wherein the judging section is configured to judge the stopped condition of said automotive vehicle by judging whether or not a value of the acceleration detection signal is kept within the allowable variation range during a predetermined period of time,
   wherein when the value of the acceleration detection signal is judged to be outside of the allowable variation range during the predetermined period of time, the judging section updates the allowable variation range using a reference value that is located in the allowable variation range, and
   wherein when the value of the acceleration detection signal is judged to be within the allowable variation range during the predetermined period of time, the judging section recognizes that the vehicle is in a stopped condition.

4. The apparatus in accordance with claim 1, wherein when the judging section judges that the value of the acceleration detection signal is outside of the allowable variation range, a value of the acceleration detection signal obtained at a time when the judging section judges that the value of the acceleration detection signal is outside of the allowable variation range is set to a new reference value, and the allowable variation range is updated in association with the new reference value.

5. The apparatus in accordance with claim 4,
   wherein the offset correcting section is configured to generate an offset correction value from an angular rate value obtained from the angular detection signals generated from the first and second angular rate sensors,
   wherein the offset correcting section performs an offset correction for said angular rate value based on said offset correction value when said judging section detects the stopped condition of said automotive vehicle, and
   wherein the sensitivity diagnosing section is configured to judge whether or not said automotive vehicle is in a turning condition based on the angular detection signals of the first and second angular rate sensors, and is configured to diagnose the sensitivity of the first and second angular rate sensors with reference to offset corrected angular rate values of the first and second angular rate sensors when said automotive vehicle is in the turning condition.

6. The apparatus in accordance with claim 5, wherein the sensitivity of the first and second angular rate sensors is diagnosed by calculating a difference between angular rate values from the first and second angular rate sensors and comparing the difference between angular rate values with a predetermined judgment threshold value, which varies depending on an input angular rate value.

7. The apparatus for correcting and diagnosing angular rate sensors installed in an automotive vehicle in accordance with claim 6,
   wherein said judgment threshold value is set in such a manner that it increases in proportion to the input angular rate obtained from the angular detection signals of the first and second angular rate sensors, and
   wherein the input angular rate value is one of: a maximum of the angular rate values from the first and second angular rate sensors, and an average value of the angular rate values from the first and second angular rate sensors.

8. The apparatus for correcting and diagnosing angular rate sensors installed in an automotive vehicle in accordance with claim 6,
   wherein said judgment threshold value is set in such a manner that it increases stepwise in response to an increase of the input angular rate obtained from the angular detection signals of the first and second angular rate sensors, and
   wherein the input angular rate value is one of: a maximum of the angular rate values from the first and second angular rate sensors, and an average value of the angular rate values from the first and second angular rate sensors.

9. The apparatus in accordance with claim 6, wherein the input angular rate value is one of a maximum of the angular rate values from the first and second angular rate sensors, and an average value of the angular rate values from the first and second angular rate sensors.

10. An apparatus for correcting and diagnosing angular rate sensors in an automotive vehicle, comprising:
a first angular rate sensor configured to generate a first angular detection signal representing an angular rate of the automotive vehicle;
a second angular rate sensor configured to generate a second angular detection signal representing the angular rate of the automotive vehicle;
an acceleration sensor configured to generate an acceleration detection signal representing an acceleration of the automotive vehicle;
a stopped condition judging section configured to judge a stopped condition of the automotive vehicle by comparing the acceleration detection signal to an allowable acceleration range, and configured to generate a stopped condition indication signal indicating the stopped condition;
an offset correcting section configured to generate an angular offset for the first and second angular detection signals based on the stopped condition indication signal, configured to generate a first corrected detection signal based on the first angular detection signal and the angular offset, and configured to generate a second corrected detection signal based on the second angular detection signal and the angular offset; and
a sensitivity diagnosing section configured to diagnose sensitivities of the first and second angular rate sensors based on the first and second corrected detection signals,
wherein the allowable acceleration range may be modified during operation.

11. The apparatus in accordance with claim 10,
wherein the sensitivity diagnosing section diagnoses the sensitivities of the first and second angular rate sensors only when an input angular rate is equal to or larger than a predetermined angular rate, and
wherein the input angular rate is one of: a maximum of the first and second angular detection signals, and an average the first and second angular detection signals.

12. The apparatus in accordance with claim 10,
wherein the stopped condition judging section is configured to judge the stopped condition of the automotive vehicle by judging whether or not the acceleration detection signal is kept within the allowable acceleration range during a predetermined period of time,
wherein when the value of the acceleration detection signal is judged to be outside of the allowable acceleration range during the predetermined period of time, the stopped condition judging section updates the allowable acceleration range using a reference value that is located in the allowable acceleration range, and
wherein when the value of the acceleration detection signal is judged to be within the allowable acceleration range during the predetermined period of time, the stopped condition judging section judges that the vehicle is in a stopped condition.

13. The apparatus in accordance with claim 10, wherein when the stopped condition judging section judges that the value of the acceleration detection signal is outside of the allowable acceleration range, the value of the acceleration detection signal obtained when the judgment is made is set as a new reference value and the allowable acceleration range is updated in association with the new reference value.

14. A method for correcting and diagnosing angular rate sensors in an automotive vehicle, comprising:
generating a first angular detection signal representing an angular rate of the automotive vehicle;
generating second angular detection signal representing the angular rate of the automotive vehicle;
generating an acceleration detection signal representing an acceleration of the automotive vehicle;
judging a stopped condition of the automotive vehicle by comparing the acceleration detection signal to an allowable acceleration range;
generating a stopped condition indication signal, indicating the stopped condition of the automotive vehicle;
generating an angular offset for the first and second angular detection signal based on the stopped condition indication signal;
generating a first corrected detection signal based on the first angular detection signal and the angular offset;
generating a second corrected detection signal based on the second angular detection signal and the angular offset; and
generating a diagnosis signal based on the first and second corrected detection signals, the diagnosis signal indicating the sensitivities of the first and second angular rate sensors,
wherein the allowable acceleration range maybe modified during operation.

15. The method of claim 14,
further comprising generating an input angular rate based on the first and second angular detection signals,
wherein tbe generating of the diagnosis signal is performed only when the input angular rate is equal to or larger than a predetermined angular rate, and
wherein the input angular rate is one of: a maximum of the first and second angular detection signals, and an average the first and second angular detection signals.

16. The method of claim 14, wherein the judging of the stopped condition of the automotive vehicle comprises
determining whether or not the acceleration detection signal is kept within the allowable acceleration range during a predetermined period of time,
updating the allowable acceleration range using a reference value that is located in the allowable acceleration range, when the value of the acceleration detection signal is judged to be outside of the allowable acceleration range during the predetermined period of time, and
judging that the vehicle is in the stopped condition, when the value of the acceleration detection signal is judged to be within the allowable acceleration range during the predetermined period of time.

17. The method of claim 14, further comprising
setting a value of the acceleration detection signal obtained when the judging operation is performed as a new reference value, when the judging operation determines that the value of the acceleration detection signal is outside of the allowable acceleration range during the predetermined period of time, and
updating the allowable acceleration range in association with the new reference value, when the new reference value is set.

* * * * *